April 4, 1939.       R. E. DUFFY ET AL       2,153,175
COMBUSTION CHAMBER FOR OIL BURNERS
Filed Nov. 1, 1935
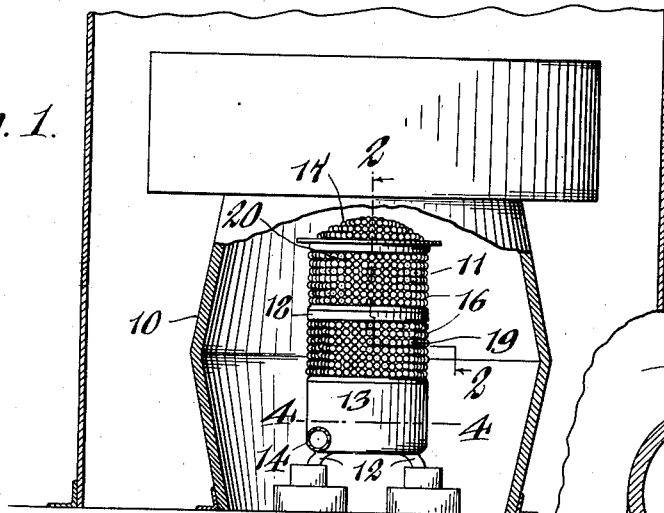
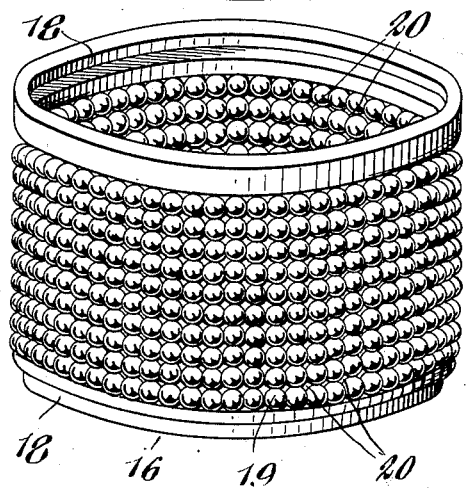
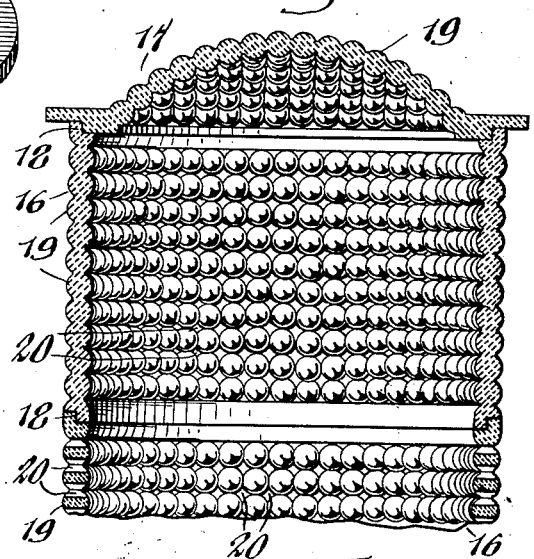
Inventors,
Robert E. Duffy,
Clarence W. Uschold,
by Walter P. Geyer
Attorney.

Patented Apr. 4, 1939

2,153,175

UNITED STATES PATENT OFFICE 2,153,175

COMBUSTION CHAMBER FOR OIL BURNERS

Robert E. Duffy and Clarence W. Uschold, Buffalo, N. Y.

Application November 1, 1935, Serial No. 47,853

2 Claims. (Cl. 158—1)

This invention relates to certain new and useful improvements in combustion chambers for oil burners.

One of its objects is to provide a combustion chamber of this character which is so designed and constructed as to effect complete combustion of the fuel economically and efficiently and to provide a maximum of heat development and transfer.

Another object of the invention is to provide a simple, inexpensive and efficient combustion chamber unit for domestic and commercial heating equipment which is so constructed as to develop a high percentage of radiant heat and to provide for a maximum of surface area within the chamber, and which effectually provides for the proper expansion of the gases, retaining them within the chamber sufficiently to increase the radiant heat transfer to a maximum.

A still further object of our invention is to provide for the introduction of the fuel to the combustion chamber in such a manner as to reduce or muffle to a minimum the whistling and other objectionable noises incident to the operation of heating appliances of this character.

In the accompanying drawing:—

Figure 1 is a front elevation of our improved combustion chamber showing the same installed in a furnace. Figure 2 is an enlarged fragmentary vertical section thereof taken on line 2—2, Figure 1. Figure 3 is an exploded perspective view of one of the combustion chamber sections and cover member. Figure 4 is an enlarged cross section taken on line 4—4, Figure 1.

By way of example, we have shown our invention in connection with a domestic type of furnace in which the combustion chamber may be readily installed, the numeral 10 indicating the customary furnace casing from which the grates have been removed, and 11 indicating in general the combustion chamber or enclosure which is supported on legs 12 in the manner shown in Figure 1.

Our combustion chamber, which has been designed more particularly for use with oil burners, is substantially cylindrical in shape and consists of a bowl-shaped base section 13 made of cast iron or like material and having a tangentially-disposed inlet tube 14 adjacent its bottom into which the customary fuel burning nozzle or fuel and air mixer 15 extends, a plurality of superposed chamber sections 16 rising from said base and made of refractory material, and a dome or cover 17 applied to the uppermost refractory section and constituting a top closure for the combustion chamber. A mixture of atomized oil and air is introduced into the pipe leading to the mixer 15 and additional air may be introduced at the mixer.

The refractory chamber-sections 16 are in the form of sleeves and are detachably connected or interlocked one to another and to the base section 13 by ring-like or flange joints 18, while the cover 17 is connected by a similar joint to the uppermost chamber-section, in the manner shown in Figure 2. The sections 16 and cover 17 are preferably shaped or molded with a wart or boss-like contour on their interior and exterior surfaces, as clearly shown in Figures 2 and 3 of the drawing, resulting in an adjoining or interconnected series of convex surfaces or ball-like elements 19 which extend in rows about the body portions of the sections 16 and 17 in approximately tangential contact with one another and produce an overall boss-like effect on both the inner and outer surfaces of the respective parts. By this construction, the surface area of the combustion chamber-sections, as well as the cover, is materially increased to accordingly increase the radiating capacity of the chamber and a maximum surface travel for the gases is afforded to expedite the combustion of the gases.

The boss-like or multi-convex surface structure of the combustion chamber sections 16 and cover 17 is also so formed that between the ball-like elements 19 there are provided discharge-perforations or openings 20 to permit the escape of the gases from the combustion chamber and thereby provide for the proper degree of gas expansion in such chamber. The resulting openings 20 are relatively small in size and serve to maintain a balanced condition in the combustion chamber, at the same time retaining the gases within the combustion chamber to obtain complete combustion of the gases and also produce a maximum of heat development and transfer.

By introducing the fuel tangentially into the bottom of the combustion chamber, the gases are directed in a turbulent like course about the inner wall of the chamber to not only muffle and reduce to a minimum whistling and other objectionable noises incident to the operation of the burner, but the gases are directed into contact with the convex surfaces of the chamber walls which provide a long gas travel to expedite combustion and increase the heat transfer to a maximum. During operation, the combustion chamber develops a high degree of incandescence and a maximum of heat is radiated from the multi-convex surfaces on the exterior of the chamber.

It will be understood that various changes in the details of construction and modifications thereof may be made within the scope of the appended claims and without departing from the spirit of our invention or sacrificing its advantages.

We claim as our invention:—

1. A combustion chamber for oil burners, comprising a cylindrical body composed of a base-section having a fuel-inlet adjacent its bottom and a superposed refractory section in which the fuel is burned, said refractory section having a cross-section simulating rows of solid interconnected, substantially ball-like elements in tangential contact with one another and being provided with openings formed between the non-contacting portions of such elements.

2. A combustion chamber for oil burners, comprising a substantially cylindrical body composed of a solid-walled base-section having an inlet at its lower end for the admission of a fuel mixture of oil and air, said inlet being disposed to direct the fuel mixture in a turbulent-like course, a perforated refractory section rising from and in open communication with said base and in which the fuel is burned, and a cover applied to the upper end of said refractory section.

ROBERT E. DUFFY.
CLARENCE W. USCHOLD.